United States Patent [19]

Gneiss

[11] Patent Number: 5,020,365
[45] Date of Patent: Jun. 4, 1991

[54] FLOW RATE METER

[75] Inventor: Heinz Gneiss, Ludwigsburg, Fed. Rep. of Germany

[73] Assignee: Robert Bosch GmbH, Stuttgart, Fed. Rep. of Germany

[21] Appl. No.: 483,710

[22] Filed: Feb. 23, 1990

[30] Foreign Application Priority Data

May 27, 1989 [DE] Fed. Rep. of Germany ....... 3917311

[51] Int. Cl.$^5$ .............................................. G01F 1/68
[52] U.S. Cl. ................................................. 73/204.27
[58] Field of Search ............ 73/204.15, 205.25, 204.27

[56] References Cited

U.S. PATENT DOCUMENTS 4,299,124 11/1981 Knapp et al.
4,299,125 11/1981 Romann et al. .................. 73/204.27
4,325,253 4/1982 Romann et al. .................. 73/861.27
4,450,714 5/1984 Prohaska et al.
4,455,878 6/1984 Kita ................................. 73/861.22

FOREIGN PATENT DOCUMENTS 3109608 9/1982 Fed. Rep. of Germany .
2845662 3/1987 Fed. Rep. of Germany .

Primary Examiner—Herbert Goldstein
Attorney, Agent, or Firm—Edwin E. Greigg; Ronald E. Greigg

[57] ABSTRACT

A device that measures the mass of air aspirated by an internal combustion engine. The device includes a hot wire which is supported by a plastic ring. Each end of the hot wire is connected to an angular connection plate which includes one end that protrudes to the outside of the ring to which an electrical connection is made, and a thin connection end which is embedded in the plastic ring to which ends of support points are connected and which the hot wire is secured.

4 Claims, 1 Drawing Sheet

FLOW RATE METER

BACKGROUND OF THE INVENTION

The invention is based on a flow rate meter for measuring the mass of a flowing medium. A flow rate meter is already known (German Offenlegungsschrift 31 09 608 which is a priority document for U.S. Pat. No. 4,450,714), which however, has the disadvantage that in so-called burn-off of the hot wire there is relatively no heat dissipation at the terminal support points, because of the large surface area of the angle connection elements, so that in a burn-off operation the hot wire does not heat up sufficiently in the vicinity of these end support points to burn off deposits from its surface. In the burn-off operation, as known for instance from German Patent 28 45 662 which is a priority document for U.S. Pat. No. 4,299,124, the hot wire is heated from its normal operating temperature of 20° C., for example, to approximately 1000° C., so that deposits firmly adhering to the surface of each hot wire are burned off. Deposits on the hot wire cause an undesirable change in the characteristic curve of the air flow rate meter, so that removing these deposits from the hot wire assures exact measurement of the flow rate of the medium over a long service life.

OBJECT AND SUMMARY OF THE INVENTION

The device having the characteristics set forth herein has an advantage over the prior art of reducing the dissipation of heat at the end support points, so that the hot wire is heated sufficiently well to nearly the end support points and deposits can be burned off from it there, thereby making a long service life possible for exact measurements.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
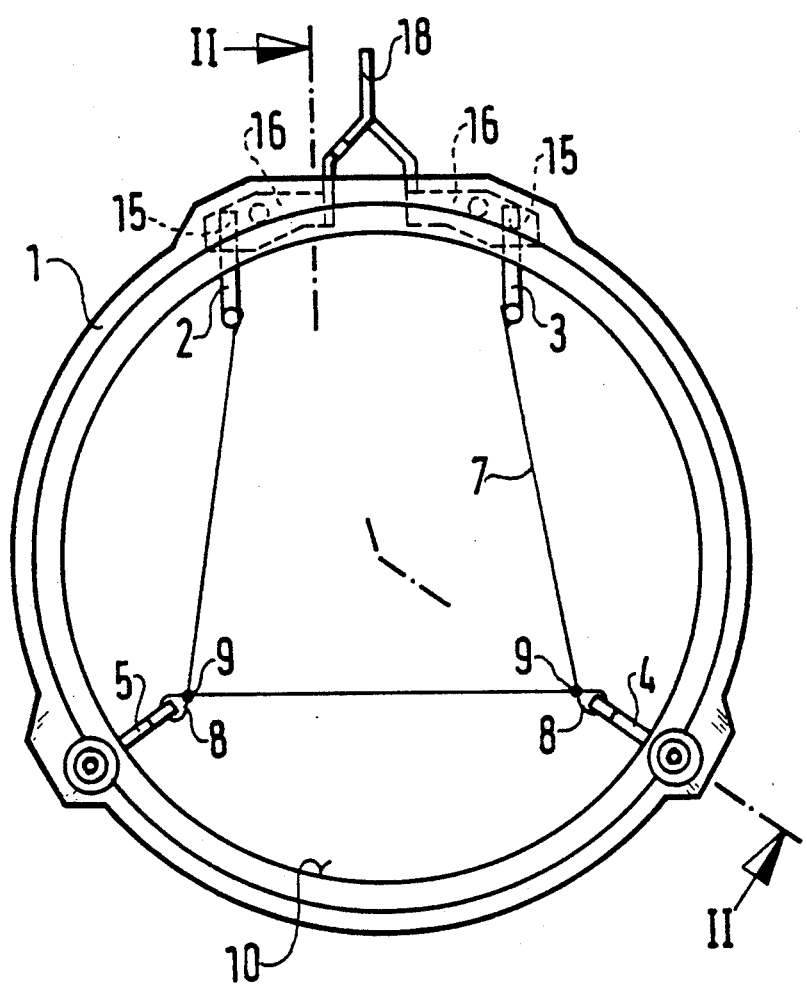
FIG. 1 shows an embodiment of a flow rate meter according to the invention.
Figure 2:
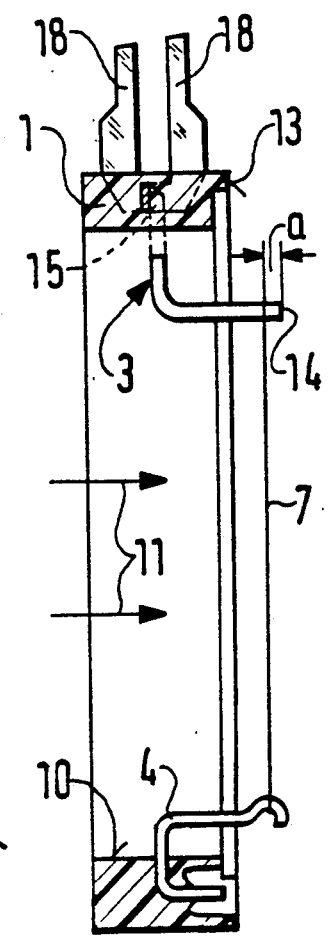
FIG. 2 is a section taken along the line II—II of FIG. 1.

FIGS. 1 and 2 show a flow rate meter, intended particularly for measuring the mass of air aspirated by internal combustion engines via an intake tube. With this device, as described in U.S. Pat. No. 4,450,714, a hot wire disposed in the flow of the medium is provided in a known manner, the temperature and/or resistance of which is regulated as a function of the flowing mass, or flow rate, and the control variable of which is a standard for the mass of the flowing medium. The device includes a sensor ring 1, which naturally may have some other suitable form, and which is cast or injection formed from plastic. Four wire support members 2, 3, 4, 5 are supported at one end by the sensor ring 1. With the aid of the wire support members 2, 3, 4, 5, a hot wire 7 is deployed along the sensor ring 1. The hot wire 7 is secured electrically conductively at its ends only at the two end wire support members 2 and 3, for instance being soldered or welded there, while the hot wire is merely loosely guided over the wire support members 4 and 5. The hot wire 7 is guided over the middle wire support members 4 and 5 in the form of a loop 8, and the wire segments of the loop 8 extending away from a given support and thus intersecting one another are electrically conductively joined together in the region 9 where they cross and touch one another, for example by welding or soldering. As a result, the loop 8 is without current and is not heated by current. Problems of an undefined dissipation of heat from the hot wire 7 to the middle wire support members 4 and 5 are thereby avoided. When the device is used to measure the aspirated air mass of internal combustion engines, the sensor ring 1 may either form part of the intake tube or be disposed inside the intake tube. The wire support members 2 and 3 are manufactured from metal wire and are bent into hooks in such a way that they extend first facing into a flow opening 10 of the sensor ring and are then bent at an angle, approximately extending in the direction of the flow 11 of the medium, such that they come to an end outside the sensor ring 1, spaced apart from a sensor end face 13. The hot wire 7 is guided along the wire support members 2–5 in such a way that the hot wire extends outside of a plane of the sensor ring 1, and the distance a of the hot wire 7 from the free end 14 of each end wire support member 2, 3 should not be greater than 0.7 mm, so that as a result, the mass of each end support points 2 and 3 and thus the amount of heat dissipated via these end wire support members are reduced, thereby assuring greater heating of this portion of the hot wire and thus adequate burn-off of deposits. Prior to the injection of a fastening end 15 into the sensor ring 1, remote from the free end wire 14, each end support member 2 and 3 has been joined to a metal angular connection plate 16 in an electrically conductive manner, for example by welding or soldering. One of the end wire support members 2 or 3 is assigned to each angular connection plate 16 which has a connection portion 18 for electrical contact. The angle connection plates 16 protrude out of the sensor ring 1 only with their connection portions 18, while each fastening end of the end wire support members 2 and 3 is embedded, with its region overlapping the angular connection plate 16, in the plastic of the sensor ring 1; that is, as compared with known devices, the mass of the angular connection plate 16 is reduced and is disposed inside the plastic of the sensor ring 1, so that only the wirelike end wire support members 2 and 3 protrude into the medium flow 11; as a result, as desired, the heat dissipation from the hot wire 7 to these end wire support members 2 and 3 is reduced. Because of the lesser dissipation of heat via the end wire support members 2 and 3, the hot wire 7 is heated during the burn-off operation even in the vicinity of the end wire support members 2 and 3, in such a way that a desired burn-off of the deposits is assured, resulting in longer service life of the hot wire 7.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A flow rate meter for measuring the mass of flowing medium for measuring the mass of air aspirated by internal combustion engines, comprising a sensor ring made of plastic, a temperature-dependent resistor disposed in the flow of the medium and embodied as a hot wire, the temperature and/or resistance of said hot wire is regulated as a function of the flowing mass and the control variable of which is a standard for the mass of the flowing medium, said hot wire being guided in the form of a loop from one end support member to another end support member along at least two additional support members supported by said sensor ring, wherein each end support member associated with one end of the hot wire is made of wire and is electrically conductively connected by a fastening end (15) to a respective electrically conductive angular connection plate embedded in the sensor ring and surrounded by plastic, said angular connection plate (16) includes a connection portion (18) which extends from said sensor ring (1) to an outside thereof and said angular connection plate (16) and said fastening end (15) of said end support members (2, 3) are embedded within and surrounded by the plastic sensor ring (1).

2. The device as defined by claim 1, in which the ends of the hot wire (7) are electrically conductively fastened to each end support member (2, 3) by a distance (a) of no greater than 0.7 mm from a free end (14) of each end support member.

3. A device as defined by claim 1, in which the free ends of each of said end support members are outside of a plane of said plastic ring.

4. A device as defined by claim 2, in which the free ends of each of said end support members are outside of a plane of said plastic ring.

* * * * *